Oct. 7, 1930.  A. ROSSI  1,777,896

PROCESS OF MAKING EDIBLE CONTAINERS

Filed Aug. 22, 1928

Amador Rossi
INVENTOR

BY Victor J. Evans
ATTORNEY

WITNESS:

Patented Oct. 7, 1930

1,777,896

UNITED STATES PATENT OFFICE

AMADOR ROSSI, OF EUREKA, CALIFORNIA

PROCESS OF MAKING EDIBLE CONTAINERS

Application filed August 22, 1928. Serial No. 301,349.

This invention relates to an article of confection and the process of making the same.

An object of the present invention is the provision of an edible container for holding confections, so that the latter may be put up in an attractive manner, and the container as well as its contents may be eaten.

Another object of the invention is the provision of a container of the above character which may be made to simulate a log.

With the above and other objects in view, the invention further includes the following novel features and details of construction, to be hereinafter more fully described, illustrated in the accompanying drawing and pointed out in the appended claim.

In the drawing:—

Figure 1:
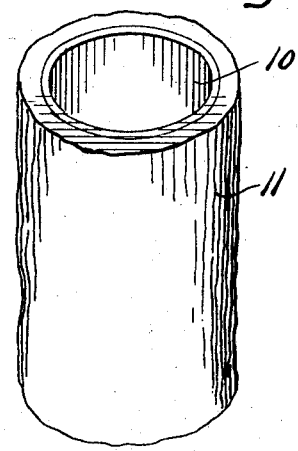
Figure 1 is a perspective view illustrating the initial step in making the container, the confection being shown as coated upon a cylinder.
Figure 2:
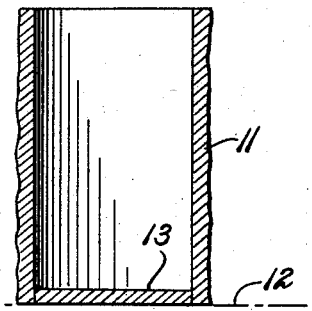
Figure 2 shows the forming cylinder removed and one end of the container closed.
Figure 3:
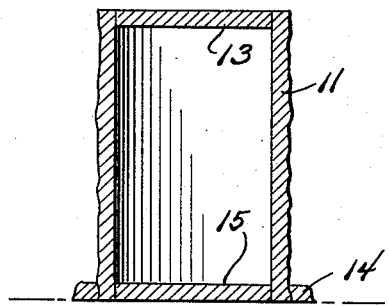
Figure 3 illustrates the manner of closing the other end of the container.

In carrying out the invention, use is made of a cylinder of suitable size which may be formed of metal, cardboard or other suitable material. This cylinder is coated with a semi-liquid or plastic edible coating, preferably chocolate and may be applied with the hands or with any suitable tool until the desired thickness has been reached. The inner cylinder which is the forming cylinder or mandrel is indicated at 10, while the chocolate or other edible coating is indicated at 11. After the coating 11 has hardened it is placed end up upon a marble slab or other smooth surface indicated at 12 and a sufficient quantity of semi-liquid chocolate is poured into the cylinder to provide an end closure 13, as shown in Figure 2. After the end 13 has hardened the cylinder is reversed and its open end is forced into a semi-liquid chocolate mass 14 so as to provide a closure 15 for the opposite end. A hollow chocolate cylinder is thus provided which is closed at each end.

The semi-liquid chocolate hardens in a very few minutes and bonbons or other small articles of confection are attached to the outside of the cylinder. This is accomplished by dipping one end of the bonbons in semi-liquid chocolate and placing these dipped ends against the cylinder so that the chocolate will harden and cause the bonbon to adhere to the cylinder. The inner surface of the cylinder is smooth while the outer surface is relatively rough and after the bonbons are applied as indicated at 16 in Figure 4 of the drawings, the article will resemble a log having stumps of branches extending therefrom.

Figure 5:
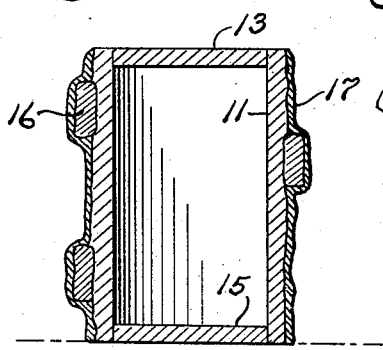
Figure 5 shows the container after the second application of confection.
Figure 6:
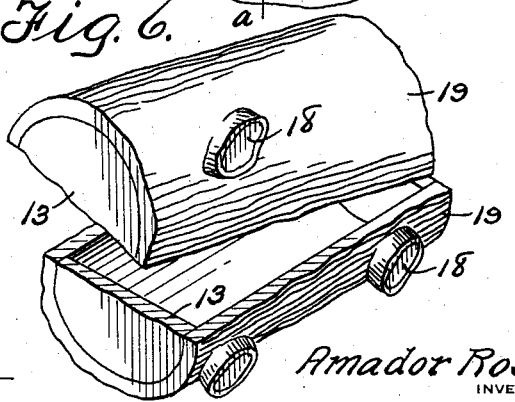
Figure 6 is a view illustrating one manner of connecting the container.

The cylindrical surface and bonbons are then covered with a second coating of semi-liquid chocolate indicated at 17 in Figure 5 of the drawings and this coating may be treated with a fork or other suitable instrument which is dug into the coating 17 so that the outside surface of the container will more closely resemble a log. The bonbons are then transversely cut so that the stumps of limbs will have a center of a different or lighter appearance than the outside, as indicated at 18 in Figure 6. This will more closely resemble severed branches.

Figure 4:
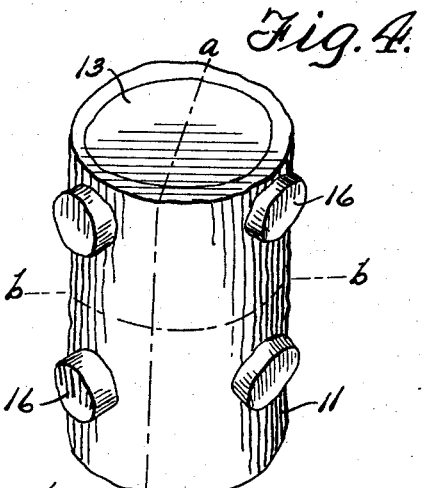
Figure 4 illustrates the container after the application of the bonbons or other small articles of confection.

The container may be cut along the dotted line aa in Figure 4 of the drawings so as to provide separate members 19 which are substantially semi-circular in cross section and provide a bottom and a cover. The container may then be filled with bonbons or other candy and the two members 19 suitably secured together. If desired, the container may be transversely cut as shown by the dotted line bb in Figure 4 of the drawing and upper and lower separate members may be provided, or, these separate members may each constitute a separate container which may be provided with a suitable closure.

If desired, the coating 17 of chocolate may extend only around the cylindrical surface of the container as shown, or it may extend around this cylindrical surface and over the ends. If the ends are left uncoated they may be of a lighter colored chocolate so as to more clearly simulate wood with the outer or darker chocolate simulating the bark.

If only a half log is desired, a mold of metal or other suitable material of this character may be used. This will provide a container which is not completely closed, but the container may otherwise be the same as that previously described.

The invention is susceptible of various changes in its form, proportions and minor details of construction and the right is herein reserved to make such changes as properly fall within the scope of the appended claim.

Having described the invention what is claimed is:

The process of making edible containers consisting of coating a stiff cylinder with a semi-liquid confection, permitting the confection to harden and then removing the cylinder, placing the hardened cylinder of confection so formed upon a support and pouring into the confection cylinder sufficient semi-liquid confection to close the lower end thereof, reversing the cylinder and immersing the other end into a semi-liquid confection to form a hollow container closed at each end, dipping one end of a plurality of small articles of confection into a semi-liquid confection and attaching said small articles to the outside of the confection cylinder, coating the sides of the confection cylinder and the small articles of confection with a semi-liquid confection and permitting said confection to harden, cutting the small articles of confection transversely to expose their interiors, and severing the confection cylinder to provide a container having a separable bottom and top.

In testimony whereof I affix my signature.

AMADOR ROSSI.